(12) United States Patent
Chapweske (10) Patent No.: US 7,555,559 B2
(45) Date of Patent: Jun. 30, 2009

(54) PARALLEL DATA TRANSFER OVER MULTIPLE CHANNELS WITH DATA ORDER PRIORITIZATION

(75) Inventor: Justin F. Chapweske, Lauderdale, MN (US)

(73) Assignee: Onion Networks, KK, Tokyo (JP)

( * ) Notice: Subject to any disclaimer, the term of this patent is extended or adjusted under 35 U.S.C. 154(b) by 888 days.

(21) Appl. No.: 10/788,695

(22) Filed: Feb. 27, 2004

(65) Prior Publication Data

US 2004/0172476 A1    Sep. 2, 2004

Related U.S. Application Data

(60) Provisional application No. 60/451,295, filed on Feb. 28, 2003.

(51) Int. Cl.
*G06F 15/16* (2006.01)

(52) U.S. Cl. ............... 709/232; 709/203; 709/217; 709/224; 709/226

(58) Field of Classification Search ........... 709/203, 709/217–219, 225, 232, 243, 224, 226, 244, 709/233
See application file for complete search history.

(56) References Cited

U.S. PATENT DOCUMENTS

| | | | | |
|---|---|---|---|---|
| 4,881,264 | A * | 11/1989 | Merkle | 713/177 |
| 6,141,659 | A * | 10/2000 | Barker et al. | 707/102 |
| 6,339,785 | B1 * | 1/2002 | Feigenbaum | 709/213 |
| 6,477,522 | B1 * | 11/2002 | Young | 709/224 |
| 6,742,023 | B1 | 5/2004 | Fanning et al. | |
| 6,771,674 | B1 | 8/2004 | Schuster et al. | |
| 6,772,337 | B1 * | 8/2004 | Yener | 713/165 |
| 7,047,309 | B2 * | 5/2006 | Baumann et al. | 709/233 |
| 7,133,368 | B2 * | 11/2006 | Zhang et al. | 370/249 |
| 7,251,691 | B2 * | 7/2007 | Boyd et al. | 709/224 |
| 2001/0051996 | A1 | 12/2001 | Cooper et al. | |
| 2002/0003541 | A1 | 1/2002 | Boyd et al. | |
| 2002/0049760 | A1 * | 4/2002 | Scott et al. | 707/10 |
| 2002/0138443 | A1 * | 9/2002 | Schran et al. | 705/64 |
| 2004/0172476 | A1 * | 9/2004 | Chapweske | 709/231 |
| 2004/0193900 | A1 | 9/2004 | Nair | |
| 2004/0205093 | A1 | 10/2004 | Li et al. | |
| 2005/0010792 | A1 | 1/2005 | Carpentier et al. | |
| 2005/0021575 | A1 * | 1/2005 | Boyd et al. | 707/205 |
| 2006/0026161 | A1 | 2/2006 | Henseler | |

OTHER PUBLICATIONS

Dessent, Brian, "Bittorrent FAQ and Guide", May 10, 2003, accessed from [http://www.dessent.net/btfaq].*

(Continued)

*Primary Examiner*—Ramy Mohamed Osman
(74) *Attorney, Agent, or Firm*—Shumaker & Sieffert, P.A.

(57) ABSTRACT

A parallel download system is described to download data from a plurality of source servers in parallel. The system may include a source scheduler, a prioritization scheduler, and an I/O dispatcher. The source scheduler generates a download schedule to control which source servers will be downloaded from at a current point in time. The prioritization scheduler tracks the latency and throughput of all channels to the source servers and dynamically adjusts the download schedule to control download performance. The I/O dispatcher produces an output stream to present the downloaded data to one or more external applications or a user.

30 Claims, 5 Drawing Sheets

OTHER PUBLICATIONS

Koman, Richard, "The Swarmcast Solution", May 24, 2001, accessed from [http://openp2p.com/lpt/a/883].*

Padmanabhan et al., "Distributing Streaming Media Content Using Cooperative Networking", Proceedings of the 12$^{th}$ International Workshop on Network and Operating Systems Support for Digital Audio: NOSSDAV, May 12-14, 2002, pp. 177-186.

Byers et al., "A Digital Fountain Approach to Reliable Distribution of Bulk Data", Proc. ACM SIGCOMM, ACM Press, New York, 1998, pp. 56-67.

V.K. Goyal, "Multiple Description Coding: Compression Meets the Network", IEEE Signal Processing Magazine, vol. 18, 2001, pp. 74-93.

Chu et al., "A Case for End System Multicast", Proceedings ACM Sigmetrics 2000: International Conference on Measurement and Modeling of Computer Systems, Jun. 17-21, 2001, pp. 1-12.

Kaminsky, D., "Vectorcast: A Proposal Regarding the efficient Distribution of Data On High Bandwidth Networks," Jan. 12, 1998, 4 pages.

Francis, P., "Yallcast: Extending the Internet Multicast Architecture," Sep. 30, 1999, pp. 1-39.

Byers, J. et al., "Accessing Multiple Mirror Sites in Parallel: Using Tornado Codes to Speed Up Downloads," Apr. 1999, pp. 275-283.

U.S. Appl. No. 11/861,774, entitled "Rate Sensitive Packet Transfer Mechanism Over a Peer-to-Peer Network", filed Sep. 26, 2007, Justin F. Chapweske.

* cited by examiner

Normal TCP    WebRAID

PARALLEL DATA TRANSFER OVER MULTIPLE CHANNELS WITH DATA ORDER PRIORITIZATION

This application claims priority from U.S. Provisional Application Ser. No. 60/451,295, filed Feb. 28, 2003, the entire content of which is incorporated herein by reference.

TECHNICAL FIELD

The invention relates to computer networks and, in particular, to the transfer of data over computer networks.

BACKGROUND

Figure 1:
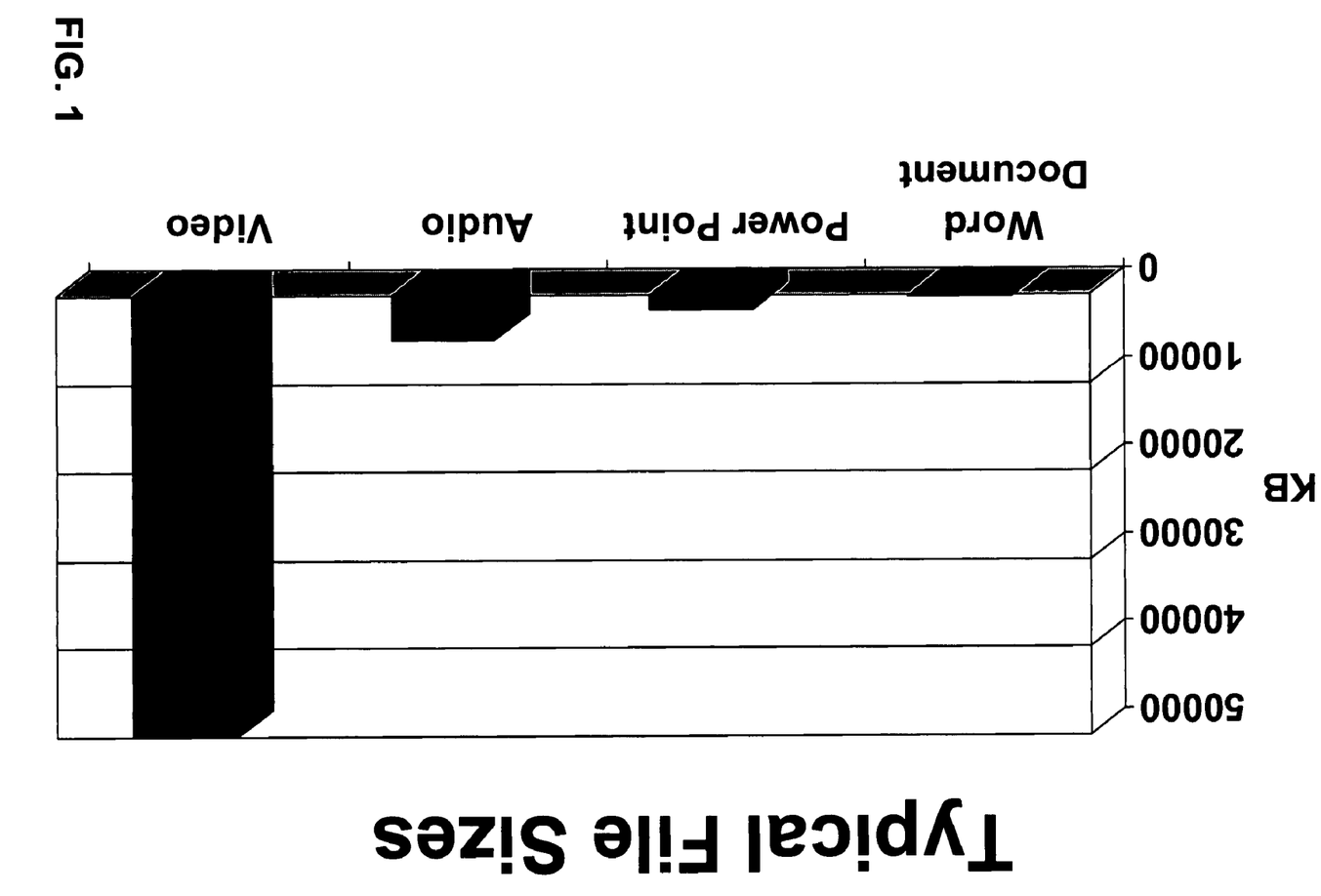
FIG. 1 is a graph illustrating typical file sizes for different types of files.

With the increasing adoption of rich-media applications involving audio and video data, and the growing adoption of broadband internet connections, the characteristics of network file transfers are quickly changing. While only a few years ago small data objects, such as HTML documents, electronic mail (e-mail), and images, dominated network traffic, there is currently an explosion in the use of rich-media technologies, such as streaming audio and video. Even the smallest video files are often hundreds of times larger than a typical e-mail or word processing document, as illustrated in FIG. 1.

With gigabyte-sized files now becoming a reality for many applications and file transfers taking many hours, even on a broadband connection, there exists a need to optimize the delivery of such files and make that delivery robust in the face of changing network conditions.

Another trend that is motivating the need for data transfer optimization is that end-user broadband connections are quickly becoming as fast as the web servers from which they are downloading the content. This means that increasingly, the originating server is the bottleneck of the data transfer and not the receiver. Conventional systems referred to as "Content Delivery Networks", such as that from Akamai Technologies, Inc., of Cambridge, Mass., work to avoid this problem by selecting a server close to the user in order to provide them with a fast download. Even with this technology, however, there can still be a bottleneck between the chosen server and the receiving host.

DETAILED DESCRIPTION

In general, the invention is directed to techniques for transferring data over multiple channels in parallel, possibly from multiple servers. This allows the bandwidth from the various sources to be aggregated to provide a very fast download.

Figure 2:
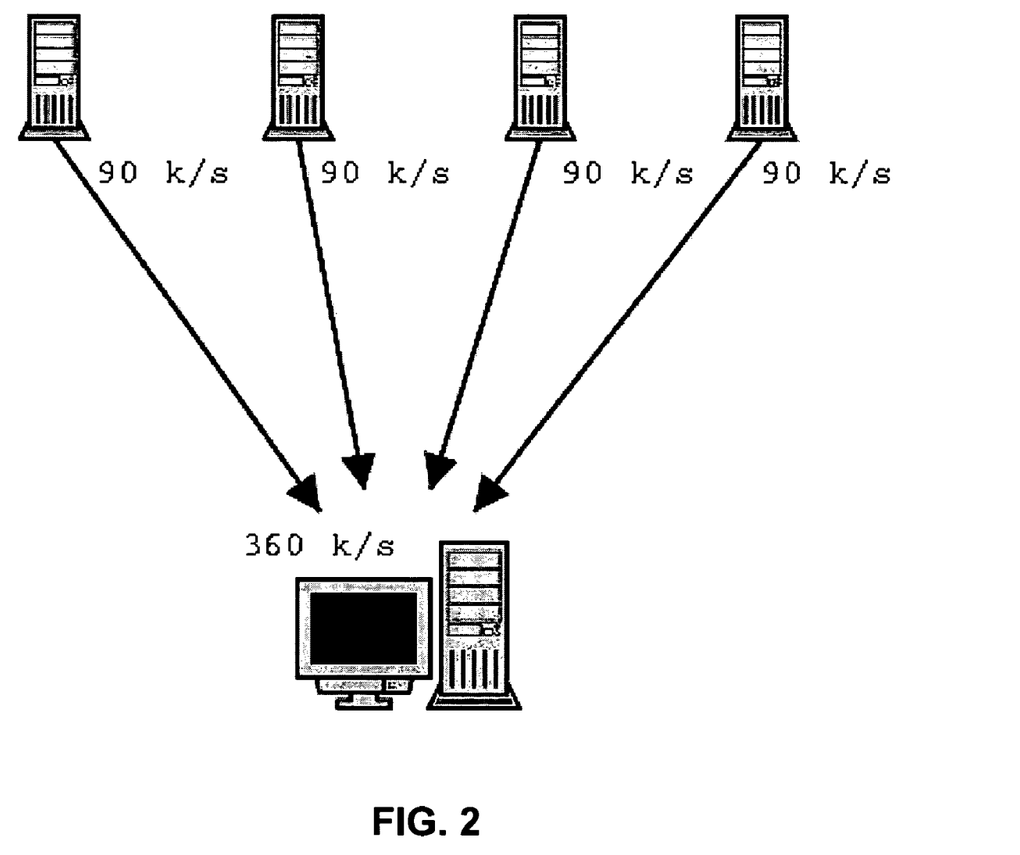
FIG. 2 is a diagram illustrating parallel data transfer over multiple channels.

As illustrated in FIG. 2, a file may be split into multiple pieces across the N servers, e.g., four servers, and may be transferred from all of them in parallel. Thus, even though each server only has a capacity of 90 KB/s, the total transfer rate is 360 KB/s.

The delivered file may be split up in a number of ways to deliver it from multiple servers in parallel. One approach, for example, is to split the file into a number of fixed-sized blocks and transfer one block from each server. For example, as illustrated in FIG. 2, four servers may be utilized, and a 20 MB file may be split into 4 pieces. Thus, each server may transfer 5 MB of data to the receiver. However, an individual server may be slow or unavailable, and thus would adversely affect the download speed.

An enhancement to the first approach is to split the file into N pieces (P1, P2, . . . , Pn). The receiver would request P1 from server1, P2 from server2, P3 from server3, and P4 from server4. Once one of those pieces is received, the receiver will request the next desired piece from the available server.

One of the unique attributes of the invention is that it allows prioritization of the order in which data is received during a parallel data transfer. Two common ways in which data is accessed within a file is either "sequential" or "random access" order. Most network protocols, such as http and FTP, transfer data in sequential order whereby the first byte of the file is received first, the second byte is received second, etc until the end of the file is reached. Most network-aware applications, such as web browsers and computer video and audio players, expect content to be received in sequential order and can actually play back content while it is being downloaded if the data is provided to the media player in sequential order.

Another increasingly common scenario that motivates data transfer optimization is the problem of moving very large files over long distances, such as between sites on two different continents. Today's standard protocols for data transfer are FTP and http, both of which operate on top of the TCP protocol. TCP contains features to provide reliable transfer of data by acknowledging the receipt of data packets back to the sender. In normal Internet operation, TCP performs very well and is quite reliable. However, TCP's performance can degrade considerably over "Long, Fat Networks" (LFNs)—networks with very high latency while having very high bandwidth. Long Fat Networks include high speed intercontinental networks and satellite-based networks. By default, TCP's buffers are not large enough to fill the capacity of a LFN, often only providing 10% of the possible speed available over a long fat network.

Figure 3:
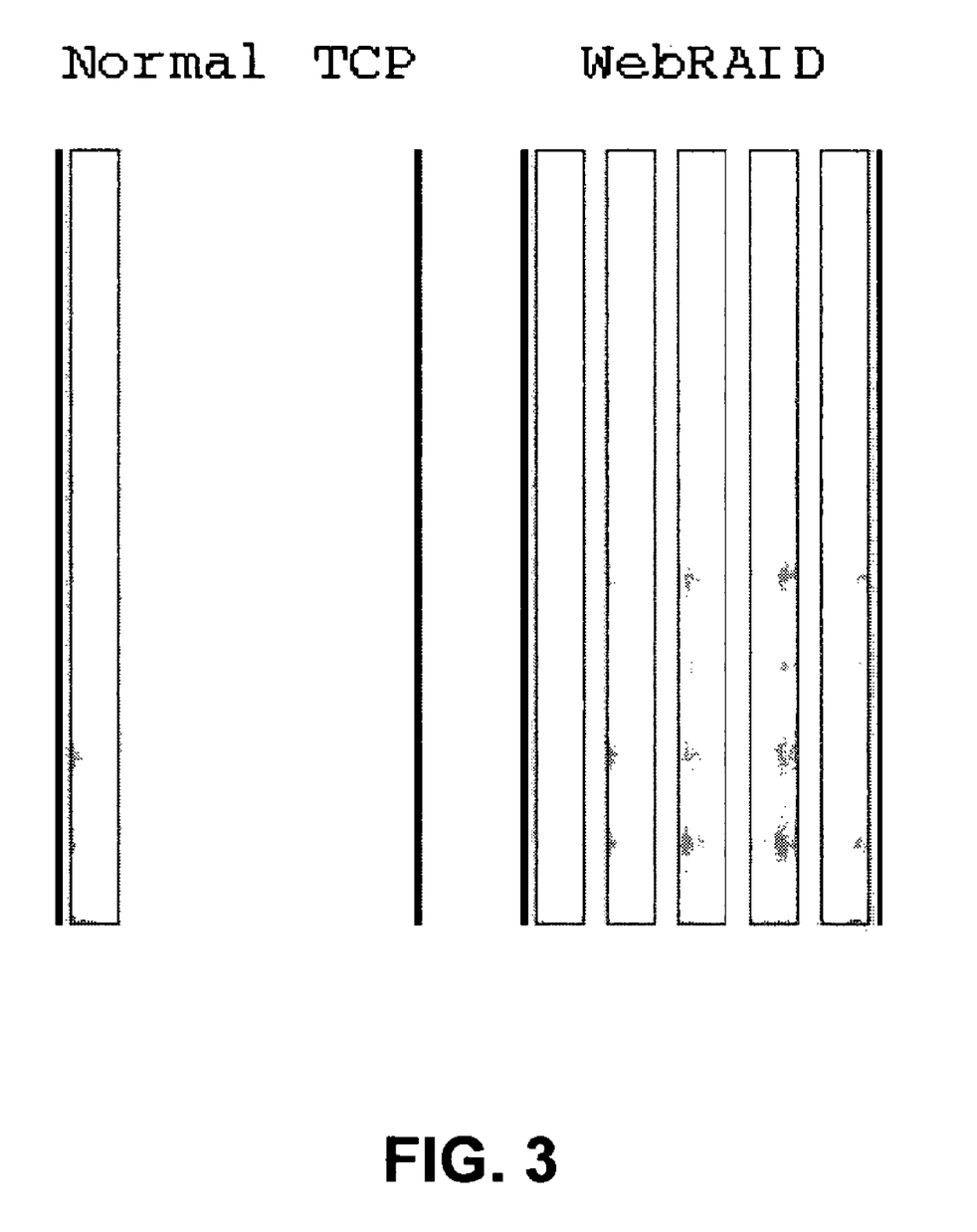
FIG. 3 is a diagram illustrating the manner in which transfer rates are increased by using multiple channels.

Parallel data transfer can also be used to improve this situation. In this scenario there is a single server and a single client, but multiple "channels" are established over the route between client and server. By transferring data along multiple channels in parallel, transfer rates up to 10× faster than normal http or FTP can be achieved, as illustrated by FIG. 3.

The invention provides reliable, high throughput, and low latency data transfer by downloading data from multiple sources or channels in parallel. The software is optimized for both very large and very small content and is uniquely designed to provide high-speed parallel streaming. The invention provides reliable downloads even when the sources have poor connectivity, and is thus ideal for distributing data over unreliable networks such as wireless networks or peer-to-peer networks. Some advantages that may be achieved by the invention are as follows:

Speed—It includes optimizations such as Dynamic Range Requests, Pipelining, and Range Preemption to download the data as absolutely fast as possible.

Intelligence—The engine will automatically discover and download from the most desirable mirrors or sources. It constantly monitors and responses to changing network conditions, optimizing the download on the fly.

Fault Tolerance—The majority of software is not robust in the face of network problems, they hit a snag and immediately throw an error or hang. In contrast, the invention automatically compensates for network problems when they arise. It routes around problems, retries, and will faithfully deliver the data.

Streaming—The engine was specifically designed to provide the fastest progressive downloads. Using the technology, one can actually watch a video as it is being downloaded from multiple sources in parallel. This is perfect for Video-On-Demand, P2P, and distance learning applications.

Security—Full support for encryption via SSL/TLS, including the ability to download content from "https" URLs.

Streaming Integrity Checking—The invention supports various integrity checking mechanisms, including "Merkle Hash Trees" which can verify the integrity of data in a streaming fashion.

Corruption Repair—The invention can automatically detect and repair corruption for any file being verified by the integrity checking system. Together these features enable "Self-Healing Downloads".

The details of one or more embodiments of the invention are set forth in the accompanying drawings and the description below. Other features, objects, and advantages of the invention will be apparent from the description and drawings, and from the claims.

Figure 4:
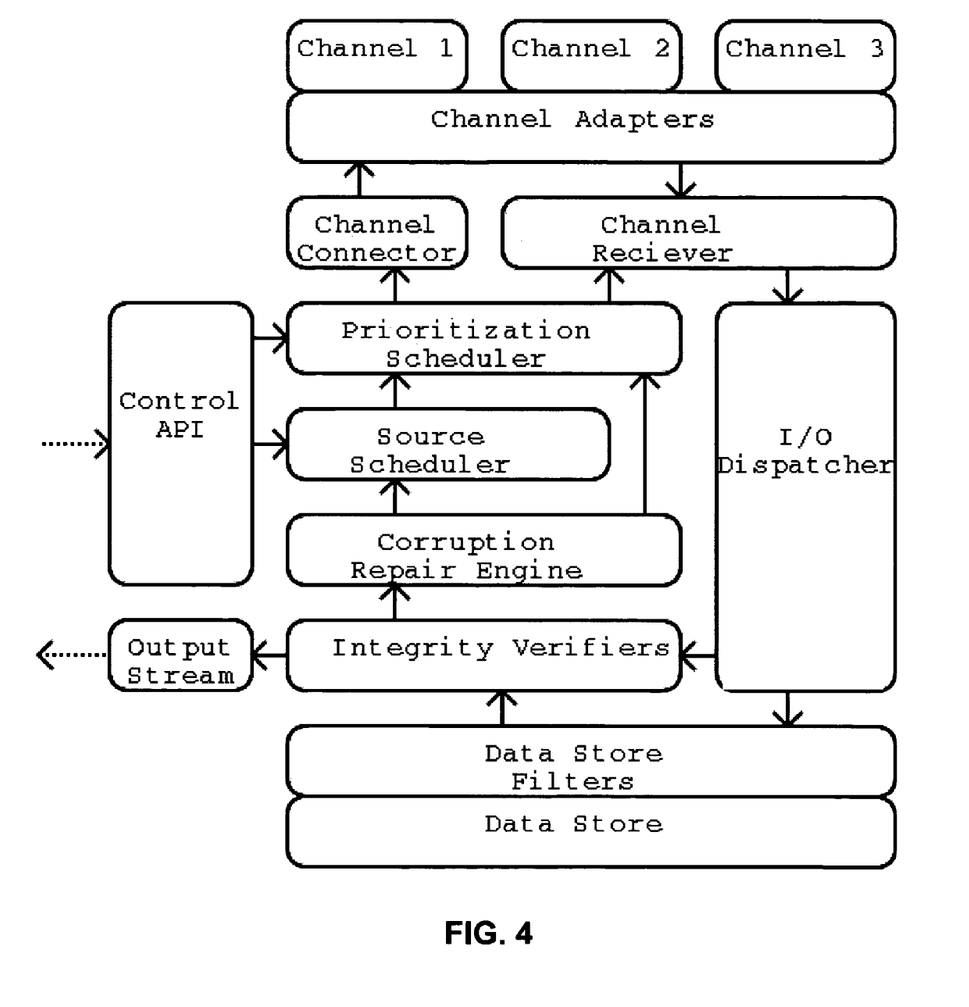
FIG. 4 is a block diagram illustrating an exemplary software architecture for implementing the principles of the invention.

FIG. 4 illustrates one exemplary software architecture for implementing the principles of the invention. More specifically, the software architecture includes a number of cooperating software modules.

Channels

The idea of having multiple "channels" from which data can be received is fundamental to the invention. A channel is any communication path along which information can be transferred. A bit is the most basic unit of information, but the invention can work equally well with any unit of information, such as a word, or a megabyte. It is anticipated that for the purposes of the invention, a byte or eight bits will be the basic unit.

While the invention is most specifically designed for transferring data across computer networks, the invention does not require the channels used to be of the same type. Channels may be provided by various networking protocols such as FTP, HTTP, or a peer-to-peer application speaking a custom protocol. Channels could also include data coming from a CD-ROM, hard disk storage, or temporary cache storage. Additional examples of channels could include wireless networks or high-speed interconnects such as USB, Firewire, or Fiber Channel.

One suggested way to implement the invention is to identify a list of available channel sources from which the content can be received. Using a Channel Connector, a channel may be established to a source and data may be received from that channel. The inventors suggest identifying channel sources by a Uniform Resource Indicator (URI). URIs are a superset of identifiers that, among other things, cover Uniform Resource Locators (URLs). Examples of URLs include (http://microsoft.com/) and (ftp://ftp.cdrom.com/) which use the HTTP and FTP protocols respectively to connect to channels and retrieve content.

The invention allows any number of channels to be opened to any combination of sources. For the case of optimizing data transfer over Long Fat Networks, the invention will utilize multiple simultaneous channels to a single source. In the case where it is desired to aggregate bandwidth from multiple sources, then multiple channels may be opened to multiple sources. Also note, that two channels to a single source, may also take different routes, thus making the characteristics of each channel different even though they may share the same protocol and source.

Channel Adapters

Channel Adapters are employed to translate encoded information from the format used to transfer it across the channel to the format desired for the download. Examples of channel encodings would include encryption, compression, parity or error correction coding, and delta or difference encoding.

For example, the invention can receive data over a compressed channel where the transport protocol supports compression. There would then be a channel adapter that automatically decompresses the encoded content and provides the Channel Receiver with the content in uncompressed form.

In another example, the invention would receive data over an encrypted channel using a protocol such as the Secure Sockets Layer (SSL) or Transport Layer Security (TLS). There would then be a channel adapter that automatically decrypts the content and provides the Channel Receiver with the content in unencrypted form. Integrity checking can also be performed within the Channel Adapters. An integrity checking error at this level will be signaled as a transport level error and the bytes that were detected to be corrupt will be thrown out and the channel will close with an error.

It may also be desired to not employ channel adapters when retrieving encoded content. A non-limiting example of this would be a video file wrapped in a Digital Rights Management encryption layer that is decoded by an external media player process.

Another service that can be added at the Channel Adapter layer is bandwidth throttling services. Various bandwidth throttling policies can be employed so that downloads from certain sources are throttled, or certain combinations of sources are throttled, or the overall download rate is throttled, or aggregate rate across multiple downloaders is throttled. One such policy is to prefer to download from sources with a cheaper bandwidth cost and if those sources are available, throttle the more expensive sources so that fewer bytes are retrieved from them.

The invention also implements Channel Adapters such that multiple adapters may be combined together so that multiple decodings may be performed on the incoming data on a single channel, such as both decrypting and decompressing content.

Control Interface

The control interface allows external applications or users to control the behavior of the parallel download system. The control interface provides a number of features:

Channel sources can be specified before the download starts.

New sources to be added while the download is in progress.

The download can be started, stopped, suspended, or resumed.

External applications can receive notifications of key events, such as when a channel connection occurs, when bytes are received, when bytes are verified, or when bytes are discovered to be corrupt.

Integrity verifiers can be specified

Connection verifiers can be specified that include metadata for the data that is desired to be transferred Various properties may be set to control the behavior of the downloads, such as whether or not the download should signal an error and abort the download process when the available sources have failed beyond a certain limit. There is also a fail-safe mode that will cause the download to continue until it is either canceled or the download has successfully completed.

A download in progress may be canceled, an individual connect process may be canceled, or a range download process may be canceled.

The control interface also allows control over the persistent data storage. If the storage is a regular computer file system, a destination file can be specified ahead of time or the destination can be set during the download.

Output Stream

The output stream is a special channel that provides the downloaded data to an external application or user. The output stream makes data available as soon as that data has been verified by the integrity verifiers. Normally the output stream will deliver data in a sequential fashion, though it can also provide data in a random access fashion. The mode by which the output stream is accessed can directly affect the data prioritization by having the output stream notify the Prioritization Engine about which bytes are the highest priority. By using the default prioritization policy of optimizing sequential data access, the output stream combined with the parallel data transfer across multiple channels provides the very novel concept of parallel streaming downloads.

The output stream may deliver data to multiple consuming applications or users. Thus one consumer may be a media player that is watching a video file being downloaded, while the data may be simultaneously streamed to hard disk storage for later playback.

Since the output stream itself is a data channel, it can be used as a source for other parallel streaming downloads that are taking place, either on the same computer, or on other computers. When the output stream is acting as a source for a download taking place on another computer, this is a peer-to-peer network transfer which provides the very novel concept of a peer-to-peer network with parallel streaming downloads. The invention can also be used to enhance the functionality and performance of swarming download systems including those embodied by the Apparatus, Method and System for an Acknowledgement Independent Equalized Data Packet Transfer Mechanism over a Peer to Peer Network for which a non-provisional patent application was filed on Dec. 28, 2001 with the application Ser. No. 10/033,305.

Source Scheduler

The source scheduler has the important job of scheduling which sources will be downloaded from at a given time. The source scheduler keeps track of various information about each channel source and uses that information to decide which sources to download from. As connections are made to the sources and data is downloaded, the channel scheduler will monitor this activity and record various information about the source such as the latency to the source, or how long it takes to receive data, and the current transfer rate from that source.

Source Ranker

The first step in the source scheduler is to rank the channel sources. Various mechanisms may be used to rank the sources. These mechanisms may include:

External Ranking—The source ranker can use a preconfigured ranking of sources as specified by the user or an administrator. The ranking can also be obtained from an external ranking service that could run on a separate server on the Internet.

Throughput—The sources can be ranked based on their throughput. Faster sources will be given a higher ranking Latency—The sources can be ranked based on their latency. Sources with the lowest latency will be given a higher ranking.

Network Hops—The sources can be ranked based on the number of network hops to the source. Sources with the lowest hop count will be given a higher ranking.

Geographical Location—The sources can be ranked based on their geographical location relative to the downloader. Closer sources will be given a higher ranking.

Channel Cost—The sources can be ranked based on how much it costs to transfer data over that path. Cheaper sources are given a higher ranking.

The ranking mechanisms can also be combined with any sort of relative weighting between the metrics. One common way to combine metrics with weighting is to use a polynomial with the variables as the metric and the coefficients used as the relative weighting. It is also possible to change the weighting of the various metrics based on external factors, such as the time of day. For instance, during critical business hours, it may be desirable to retrieve data from the fastest possible sources, while during the evening it may be desirable to minimize the cost of the data transfer.

If the goal is purely to provide the fastest possible data transfer, then a combination of the throughput and latency metrics works quite well in practice for ranking the various sources.

Slot Manager

The basic strategy that the source scheduler employs is to assign channel sources to a number of source "slots". The source scheduler is configured with an average number of slots it should maintain as well as a maximum number of slots. During a download channels are frequently opened and closed, often leaving slots available for other channels to fill. After a source has obtained a slot from the download scheduler, that source is given to the data prioritization scheduler to determine what bytes to download from that source.

When a source is initially added to the download engine, either at the beginning of the download, or as a new source during a download, there may not be any information available for the Source Ranker to make a decision about the desirability of that source. Since characteristics such as throughput and latency are often only discernable by downloading from the source for a while, the channel scheduler will give new sources a chance to immediately obtain a slot, up to the maximum number of slots.

Once enough information is available for the Source Ranker to properly evaluate the channel source, it is thereafter required to acquire one of the normal slots, of which there is a limited number that is less than the maximum number of slots. In general, as soon as a normal slot becomes available, the channel scheduler will choose the highest ranked available source and give the slot to that source. As soon as the source has been allocated a slot, it is denoted as no longer be available and is not eligible to obtain a new slot until it finishes its current transfer. However, keep in mind that a single physical source, such as a web server, may be identified by multiple URIs which allows the invention to schedule multiple connections to a single physical source at the same time.

Another non-limiting example would be to highly prefer nearby sources on a computer network such that if a nearby source is detected, the engine will only schedule from that source even though multiple source slots may be available. In another possible usage, very high priority sources may utilize multiple slots, or fewer slots may become available if very desirable hosts are located.

Another major feature of the channel scheduler is that it can perform compensate for latency to a source by "pipe-lining" requests to a single source. Thus, the source scheduler may make a source available to be rescheduled slightly before it is finished with its current transfer. This allows the prioritization scheduler to reschedule the source and make a new connection before the current transfer completes. Ideally the new connection will be established exactly when the previous request is complete, thus avoiding wasting any time between transfers.

Prioritization Scheduler

Figure 5:
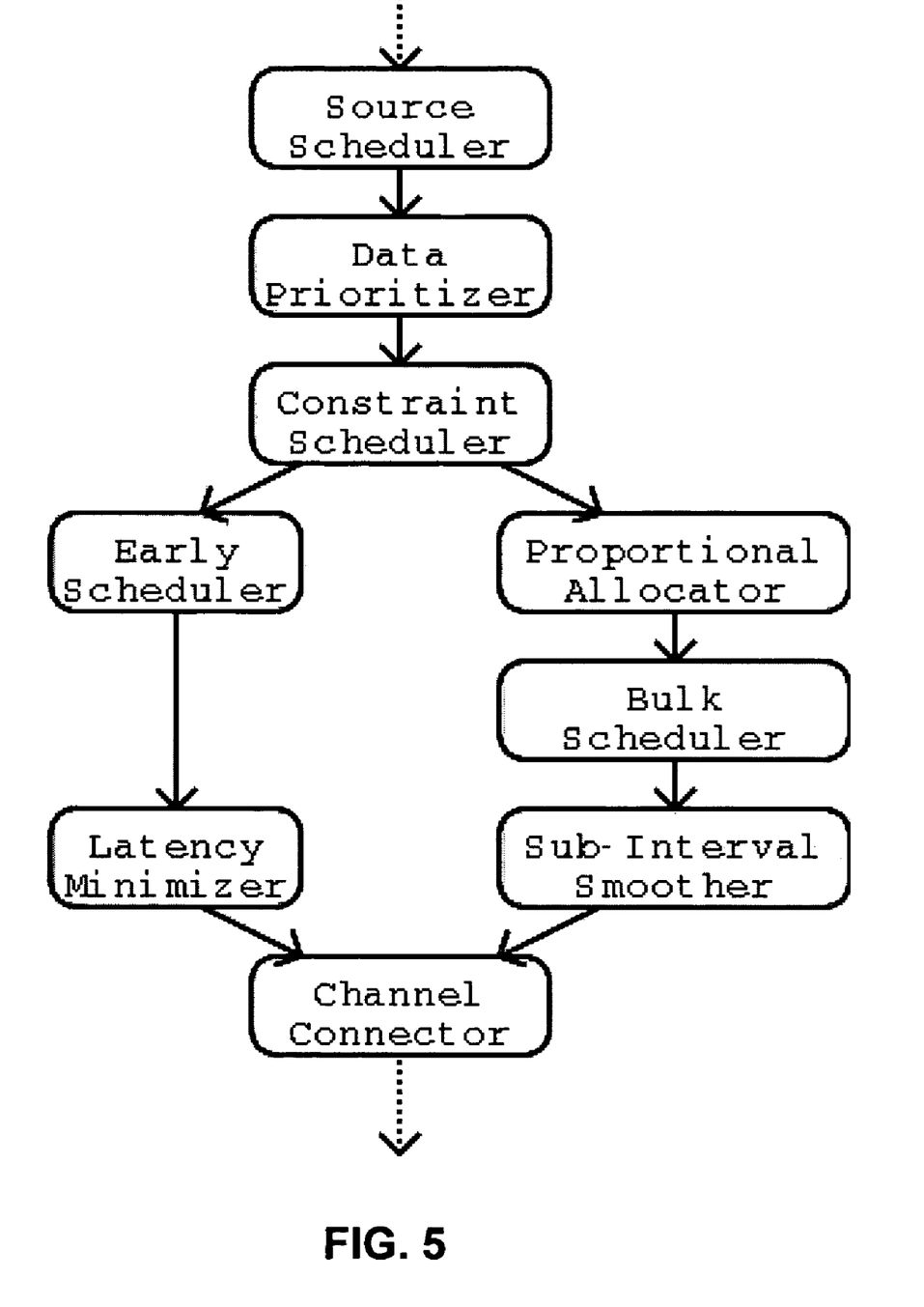
FIG. 5 is a flow diagram illustrating techniques for prioritizing data for transferring data over multiple channels.

As illustrated in FIG. 5, after the Channel Scheduler has chosen a source to fill a slot, that source is then passed on to the prioritization scheduler, which will decide what data is requested from the source and at what time. The prioritization scheduler tracks the latency and throughput of all channels at all times and dynamically adjusts its scheduling in order to maximize download performance while still prioritizing the order in which that data will be received.

Data Prioritizer

The first component in the prioritization scheduler is the data prioritizer, which determines the priority of the data to be scheduled. The data prioritizer specifies an ordering of data from the highest priority data to the lowest priority data. Two examples of policies for the data prioritizer are sequential prioritization and on-demand prioritization.

Sequential prioritization is a simple and common prioritization where the first byte of the file has the highest priority, the second byte has the next highest, and so on until the last byte which has the lowest priority. For simplicity, most of this specification makes explicit reference to sequential or progressive prioritization, though the invention is not limited to these prioritizations.

On-demand prioritization specifies an ordering that can change during the lifetime of the download. In on-demand prioritization, the highest priority data is that which external applications are attempting to access, the next highest priority data is the next data the applications is expected to access. In this scheme, the lowest priority data is that which is expected to be accessed last. Another component that can drive the data prioritizer is the corruption repair engine. If the corruption repair engine detects corruption in previously downloaded bytes, it will specify that the prioritizer set a higher priority on the bytes that it is repairing rather than new bytes that are being downloaded. In the case where multiple components or applications are attempting to simultaneously specify different portions of the data set to prioritize, the data prioritizer may employ a prioritization scheme such as First Come First Serve, Last Come First Serve, Random, Shortest Processing Time First, Round Robin, or Shortest Remaining Processing Time First or any other flow scheduling algorithm. In the First Come First Serve scheme, the data set portions specified first get the highest priority. In the Last Come First Serve scheme, the data set portions specified most recently get the highest priority. In the Random scheme, the data set portions are chosen at random. In the Shortest Processing Time First scheme, the smallest, or cheapest to retrieve data set portions are given the highest priority. In the Round Robin scheme, each data set portion is made the highest priority data in turn in order to ensure scheduling fairness. In the Shortest Remaining Processing Time First scheme, the data set portion with the least amount of data waiting to be received is given the highest priority.

The data order prioritizer may also prioritize the data order based on high-level system or network optimization policies. An example of one such policy is for the data order prioritizor to give the data set portions that are available from only a few sources a higher priority than data set portions that are widely available.

Range Scheduling

As an optimization, the prioritization scheduler schedules ranges of bytes to be downloaded. A range is essentially a run length encoding of a sequential list of bytes. A set of bytes can then be compactly represented as a range set which allows all normal mathematical set operations to be efficiently performed on the list of bytes. The invention may utilize range sets extensively in its implementation for any task that requires keeping track of a list of bytes. Examples of ranges and range sets are as follows:

10-20—Inclusive list of bytes 10,11,12, . . . ,20

1,3,10-20—Inclusive list of bytes 1,3 and 10,11,12, . . . ,20

0— —Inclusive list of all bytes from 0 to inifinity, or the end of the file.

−20— —Negative ranges start from the end of the file. So this range is a list of the last 20 bytes in the file Ranges provide a very compact and natural way to describe scheduling of a content channel. Most modern network protocols such as HTTP and FTP support specifying a range of bytes that the receiver desires to download. For example, in HTTP, this is accomplished by using a special header as follows:

Range: bytes=100-3000

Additionally, the ranges scheduled by the prioritization scheduler do not necessarily need to correspond to a range of bytes at a given source. These ranges may correspond to data that is interleaved or otherwise encoded. In these cases, a range adapter is used to map the scheduled range onto the list of interleaved or encoded bytes that the source can interpret.

Also note that a single byte is still a range with one element. So, although much of this specification refers to ranges of bytes, it also encompasses byte-by-byte data transfer and scheduling. Ranges also encompass fixed-size data packets or blocks of data as well. In the cases where this specification refers to a dynamically sized range of data, this also includes a dynamically calculated number of data packets or data blocks.

Proportional Allocator

After the data has been prioritized, the Proportional Allocator determines how much data will be transferred from the channel that is being scheduled. This amount of data will be proportional to the throughput that is expected to be received over the channel from the source currently being scheduled. If desired, this policy allows multiple channels transferring data in parallel to complete their transfers at roughly the same time. Thus, if there is a source A that has an expected throughput that is ten times faster than source B, the proportional allocator will allocate ten times more data to the schedule for source A. The proportion of data is also bounded by minimum and maximum values, or can be hard coded for a specific amount of data, making the amount of data received equal among all channels.

In the suggested implementation of the invention, the proportional allocator will use time intervals to determine the proportion of data to be downloaded. First, the proportional allocator, chooses an interval T, and calculates how much data is expected to be received from the source being scheduled based off of its expected throughput and latency. This approach fairly allocates the amount of data among the sources without having to know the throughputs of all of the sources ahead of time. This approach also places a bound on the amount of time data is being received from a channel, allowing other sources an opportunity to be scheduled once the data has been received.

The proportional allocator automatically responds to different transmission speeds, scaling to provide very low over head data transfer for high speed channels, while ensuring that low speed channels get tight interleaving between the channels and plenty of chances to reschedule channels.

An enhancement to the interval-based approach is to dynamically change the interval based on the expected overall throughput across all channels. In this case, a given amount of data is scheduled to be allocated during the current interval. The time period T, is then set to be equal to the expected amount of time it will take to download that amount of data from all channels. This approach allows the interval-based allocator to ensure proportional allocation for each block of data within the file.

Another approach to the proportion allocator is to allocate fixed size and usually small amounts of data to each source. Once the source has received most of the data it has scheduled and is ready to pipeline another request, it is allocated another fixed size amount of data. In this fashion, each source is scheduled proportional amounts of data, because the fast channels will request allocations at a proportionally higher frequency than slow channels. This approach is similar to what happens when the maximum packet size in the interval allocator is set to be very small relative to the size of the interval.

Bulk Scheduler

After the proportion allocator has determined the amount of data to be received from the source, the bulk scheduler then determines which bytes will be scheduled. The bulk scheduler maintains a list of data that has yet to be scheduled, as well as a list of data that has already been scheduled, but has yet to be received from a channel. If available, the bulk scheduler will schedule the highest priority unscheduled bytes up to the amount of data specified by the proportional allocator. In some cases, this may be less than the allocated number of bytes, in which case the smaller amount of data is actually scheduled.

If no unscheduled bytes are available, the bulk scheduler will schedule high priority bytes that have been scheduled, but have not yet been downloaded. Also, if the range has already been scheduled, but is just being served by a slow downloader, then it downloads from the end of the undownloaded range, preempting some of the range that has already been scheduled for another source. Once the other source catches up to the preempting source, the download from the other source is canceled.

Any time that the Bulk Scheduler preempts the download of another channel, it attempts to schedule the bytes to be downloaded such that the original source will catch up with the preempting source at the exact moment that the preempting source finishes its transfer.

Advanced Scheduler

The advanced scheduler provides a number of optimizations over the bulk scheduler. First, the advanced scheduler integrates with the interval-based proportional allocator to allow data to be allocated during a different time interval than the current one. It then figures out how much time is left in the current cycle, then calculates the time needed to complete a range request by setting a minimum range size and incorporating the amount of time necessary to accommodate for the latency of making a new connection. If this download will not be able to be completed within the current cycle, it is scheduled to complete during the next cycle.

Normally the download is started from the front of the unscheduled ranges, but if the source is too slow to complete the minimum required bytes within the cycle period, then it is required to download from the end of the range. During each new schedule, we check to see which source is the bottleneck in providing the next high priority bytes, if this host has not provided its content within a reasonable time period of the end of the cycle, then the new source is scheduled with the undownloaded bytes of the bottleneck source as the parent for the new download. The advanced scheduler will then schedule the suffix of that range to be downloaded.

Sub-Interval Smoothing

The advanced scheduler features a sub-interval smoothing component that works to minimize the burstiness of the availability of high priority data with the interval-based allocator. With the interval-based allocator, one source is always going to be the bottleneck for the stream while the other sources provide data that is a bit lower priority. Once the stream is ready to read lower priority data that has already been downloaded by another channel, the already downloaded data is read in a burst until it catches up with the next bottleneck source. In this fashion the priority stream consumption goes from relatively slow consumption to very high consumption as the stream catches up with the already buffered data.

The invention works to eliminate this burstiness as much as possible to enable the delivery of high priority data in as optimal an order as possible. The sub-interval smoothing works by intelligently interleaving the data from the multiple channels that will be delivering data during the interval. For a given set of data clusters, find the single data cluster that will take the longest amount of time to retrieve. Then locate any clusters that will take equal or less time to retrieve. If multiple clusters from the same source can combine to take less time than the initial cluster, then these multiple clusters will be combined together. Once all clusters have been allocated and found, the clusters are ordered by the fastest source to the slowest source. These clusters can be scheduled incrementally using historical ranking between sources. Thus if one source was the fastest in a previous schedule, it would be expected to be the fastest again in the next schedule and would be scheduled before other clusters in the next interval.

The result of this sub-interval smoothing is that the fastest source is almost always the bottleneck of the download, and it minimizes the length of the burst when that fast source catches up with the already downloaded data from the other sources. A minimum cluster size may be dictated by latency and throughput to enable efficient pipelining of requests.

Minimized Latency Scheduling

At the very beginning of the download before any historical data has been established with which to predict future throughput of sources, or perhaps even before the length of the file is known, the invention utilizes special optimizations to reduce the latency of delivering small objects. In general a key goal of the invention is to reduce inefficiency by not downloading redundant information. The minimized latency scheduler sacrifices some of this efficiency for lower latency by requesting the same range of information from many sources in parallel. In general, this amount of information is a small bit of information from the front of the file such that if the total file size is less than that segment size, then the download will be complete as soon as the first channel responds back with data. If the file is larger than the segment size, then the initial request from the sources may introduce some redundant data, but more importantly the scheduler now has performance information on the sources and can use that to optimize the schedule.

An additional optimization for the case when the file size is unknown is to have every other source request its data from a negative offset, which is from the end of the file, in order to minimize overlap in the case that the file is larger than the size of the blocks being requested from the hosts.

Constraint Scheduler

Since not all sources have the same capabilities, or even the same data, a constraint scheduler is utilized to ensure that the scheduler does not attempt to retrieve data that the source or channel cannot provide. An example of the constraint scheduler utilizes a list of bytes that the source advertises that it has available. If some of the bytes that the scheduler is trying to schedule for that source are unavailable, the scheduler will choose lower-priority bytes that are available for the scheduler to download.

Sources are not necessarily required to store an entire copy of the content. Sources may communicate back with the download scheduling engine about the ranges of bytes they have available, possibly using Run-Length Encoding to concisely describe those bytes. Other encodings may be used, including predetermined (or not predetermined) schedules or interleavings of bytes. The scheduling engine will then use the knowledge of which sources have which bytes to determine when to download content from various sources. The range of bytes provided by a given source may also change over time, so that fewer or greater bytes are available from that source. A source may also include a different version of the same file that shares some bytes in common with the version that is intended to be downloaded. These bytes need not correspond to the same byte position in each file and a decoder module would be used to translate between the bytes locations in the different versions of the file.

If the source is highly constrained in the data it can deliver, this can also negatively affect the source's ranking to the source scheduler.

Channel Connector

After the prioritization scheduler chooses the range of bytes to be downloaded, it is the channel connector's job to establish a new channel to the scheduled source. The protocol spoken by the channel connector to the channel source is translated by the channel adapters. In general, the channel connector will make a request to the source that contains the range or ranges of information that is scheduled to be downloaded. The time is then measured between when the channel requests the new range and when data starts being received. This time is the latency of the connection. For many protocols, it is common for the channel connector to receive meta-data about the file in response to the connection, such as the file length, media type, and caching information. The Channel Connector then verifies this data with the known meta-data for the file. If there are critical differences between the channel meta-data and the known file meta-data, such as a difference in the file size, then it is assumed that the channel has the incorrect file, or an incorrect version of the file, and the channel connection is then canceled.

If there is a problem in connecting to the channel, the channel connector will notify the source scheduler of the situation and the source schedule will attempt to another get a slot for the source, reschedule it, and retry the connection process.

Another thing that can happen is that the source itself may choose to redirect the download request to another source. In this case, the channel connector automatically redirects the channel to the new source and continues the download just as if it had connected to the original source.

In some cases, the source may also be busy, or may not have available the content that the scheduler intends to receive. In this case, any information about the source such as the bytes that it has available for scheduling is reported back to the source scheduler and constraint scheduler which then attempt to reschedule that source for a later time or a better range of content.

Channel Receiver

Once a connection to the channel is established, the channel receiver reads the data from the channel and writes it to the I/O dispatcher. In some cases, the actual bytes given back by the channel will differ from the ones that are requested to be scheduled. In this case, if the bytes haven't already been received or are being used for corruption repair, the channel receiver will accept those bytes and write them to their proper locations. If the channel begins overwriting data that has already been downloaded, then the channel receiver may choose to cancel that transfer.

I/O Dispatcher

The I/O dispatcher takes the bytes being written from all of the channel receivers and provides them to the integrity verifiers and provides the data to the data store for persistent storage.

Integrity Verifiers

The integrity verifiers are used to ensure that the desired data is received intact and that none of the channels were providing data that is either corrupt or a different version of the content that is desired. Once some of the data has been verified, it is allowed to be accessed via the output stream. If the data is found to be corrupt, then the Corruption Repair engine is notified of this and will work to repair the corruption. A number of approaches is used to implement integrity verifiers, but the most common approach is to use cryptographic hash algorithms to verify that the content was received in tact.

A simple integrity verifier uses a full file hash, which is the result of applying a cryptographic hash function or checksum algorithm to the entire file. These full file hash algorithms can be calculated incrementally by feeding the bytes of the content into the hash function in order, but the final result of the hash function cannot be obtained until the entire file has been processed. Thus, if the integrity verifier indicates that some corruption is present in the file, it must provide the entire file to the corruption repair engine, because it cannot know what specific bytes of the file are corrupt.

An improvement upon this approach is to use multiple hash functions that cover different portions of the file and can pinpoint corruption to smaller sections of the file. One approach to this is to use block hashes, where a hash function is applied to fixed length blocks of the content. This allows the integrity verifier to pinpoint which blocks are corrupt, and any blocks that are successfully verified can be immediately accessed via the output stream.

A third and suggested implementation of an integrity verifier utilizes Merkle Hash Trees. The Merkle Hash Tree, invented by Ralph Merkle, is a hash construct that has very nice properties for verifying the integrity of files and file subranges in an incremental or out-of-order fashion. This approach has the desired characteristics missing from the full file hash approach and works well for very large files. The idea is to break the file up into a number of small pieces, hash those pieces, and then iteratively combine and rehash the resulting hashes in a tree-like fashion until a single "root hash" is created.

The root hash by itself behaves exactly the same way that full file hashes do. If the root hash is retrieved from a trusted source, it can be used to verify the integrity of the entire content. More importantly, the root hash can be combined with a small number of other hashes to verify the integrity of any of the file segments. By using more or less data from the hash tree, the verification resolution can be increased or decreased respectively. The suggested implementation of a merkle hash tree verification engine for the invention dynamically adjusts the verification resolution of the tree based on the rate at which the content is currently being downloaded. The dynamic verifier fixes a time interval T and aims to do one verification within each time interval T. In order to accomplish this, it calculates how much data is expected to be downloaded in time T and downloads just enough hash data so that the verification resolution enables verifying all of the content downloaded during T with a single hash. For efficiency, the tree hash is implemented using a stack-based approach that only requires $O(Log(n))$ hashes to be stored in memory for any given operation, including streaming verification.

Another important aspect of the hash tree verifier is how it responds in the case that corruption is detected. In this case, the verification resolution will dynamically be increased by one and additional hash data will be retrieved to enable finer-grained integrity checking. The corrupt data block will then be rechecked at the smaller resolution at which point some of the data that was previously thought to be corrupt will be proven to be valid. This process continues until the verification resolution has reached its maximum configured level. In turn, the blocks that are still found to be corrupt at the end of this process will be passed on to the corruption repair engine.

The Integrity Verification Engine allows multiple content checking algorithms to be combined. An additional component that may be combined with the above cryptographic integrity verifiers is one that uses a known number of bytes, such as the first 256 bytes of a file that it received out of band and uses that to compare against the file being downloaded. Thus the exact matching verifier could be used at the same time as a hash tree or full file hash integrity checking component. If the exact matching verifier matches a block of data successfully, then that data is declared to be valid and does not need to be further verified by other verifiers.

Corruption Repair Engine

The corruption repair engine has the task of attempting to repair corruption that is detected by the integrity verification engine, and will attempt to prove which source or sources caused the corruption. The integrity verification engine provides the corruption repair engine with a block of data that is corrupt. At the same time, the integrity verification engine may be using additional techniques to try to pinpoint the corruption to a smaller block of data. If a smaller area is pinpointed, then the corruption repair engine will be updated with this information to make it easier to repair the corruption.

The corruption repair engine keeps track of a list of all of the bytes that have been received from each source. This list may utilize run-length encoded data structures in order to efficiently keep track of various ranges of bytes that have been retrieved. The first step in the corruption repair engine is to determine which sources provided data to the corrupt block. At this point there are a number of possible corruption repair algorithms.

A recommended corruption repair algorithm is to choose one or more "suspect" sources in each phase of the repair. The Corruption Repair engine then creates a new Source Scheduler that is limited to the non-suspect sources, and creates a new Prioritization Scheduler that is specified to only download the data that is being repaired. A new corruption repair scheduler may be created to repair the corrupt portion while the normal schedule continues with the file download. The data that was received by these suspect sources is then redownloaded by non-suspect sources, and the integrity verification engine rechecks the integrity of this repair attempt. If the repair attempt is successful, then at least one of the suspects was providing corrupt data. If the repair was not successful, then at least one of the non-suspects was providing corrupt data.

The choice of suspects can be based on a number of heuristics such as trust metrics, geographical location, software version, etc. One good heuristic is to sort the possible suspects according to how much data was received from them in the corrupt block. The sources that uploaded the least amount of data are then marked as the most likely suspects. This approach is good for two reasons—first it forces corruptors to provide a lot of data in order to avoid being flagged as a suspect. This contrasts to corruptors being able to provide single bytes of corrupt data for very low cost. Secondly, by flagging the ones with the least amount of data, it gives the repair engine a chance to repair the corruption with downloading the least amount of data.

The suspect choosing algorithm is combinatorial. First single suspects are chosen, then they are combined with other suspects in the case that multiple hosts might be colluding to corrupt the download. The combinatorial algorithm uses most of the previous suspects when generating new suspect combinations so as to minimize the amount of data that needs to be redownloaded during each phase.

An additional enhancement to this corruption repair process is to keep track of whether or not newly downloaded data is the same as the data that is already downloaded. In this way, it can be probabilistically determined which hosts may be causing the corruption by observing which combinations of hosts are providing different data from each other.

Download sources are shared across all schedulers so that if a download source is found to be providing corrupt data, then that source is signaled as a bad source and will be removed from all source schedulers. Optionally the corruptor may be reported to other hosts in the network or to a central authority so that other nodes may decide to avoid the corrupting host in the future.

Data Store Filters

The invention supports arbitrary layering of file storage technologies, to allow things such as keeping track of the bytes downloaded for enabling resumes in the future. One such layered file storage filter would be a compressor or encryptor module that stores the bytes on disk in encrypted or compressed form even though the output stream is providing the content in an uncompressed or unencrypted form.

Another optional layer is one that allows the physical location of the file store on disk to change while the download is taking place. For instance, if the file store runs out of disk space on one hard drive, it can be transparently migrated to another hard disk without affecting the modules that are reading and writing data to the data store.

Another possible filter could automatically compress the files in the store or delete old files using a Least Recently Used policy if the file store has become to large or has run out of disk space. This allows the file store to automatically make room for the new download without affecting the download in progress.

Data Store

The data store physically stores the data on disk as it is being downloaded. This data is then accessed by the output stream and the verification engines in order to verify and process the data. The data from the data store can also be saved as a normal file once the download completes, allowing the content to be accessed as a normal file in a computer file system.

During the download the file is stored in a temporary location such as a user-specific temporary directory or a system wide temporary directory. Via the control API, it is possible to set the destination where this file will be saved to. As soon as the destination is known, the file is moved to the same directory as the final destination, but still using a temporary file name. The file is not moved to its final destination name until the download has completed entirely and the integrity of the file has been fully verified.

Aggregate Behavior

Certain data structures can be shared across instances of the invention, such as information about the latency and speed of individual sources, as well as whether or not they have been detected as providing corrupt data in the past. These data structures can be used to quickly determine optimal sources for a separate download that is contacting the same set of hosts.

The invention can also perform prioritization and queuing across instances. This allows different priorities to be assigned to different content. One such policy is a "smallest content first" policy, whereby small files are scheduled to download before big files.

One suggested way to implement prioritization is to use shared data structures for bandwidth throttling across all instances of the invention. This allows fine-grained control over the rate that the data is being received from the source.

In one embodiment, the invention is directed to a method comprising communicating data over a computer network via multiple channels in parallel with data order prioritization. The data order may be prioritized in a sequential or progressive fashion, providing a parallel streaming download. The data order may be prioritized on-demand by external components or internal components such as a corruption repair component. The data order may be prioritized utilizing an algorithm that proportionally allocates the amount of data to be received based on the throughput and latency of the channel or channel source. The data order may be prioritized utilizing an algorithm that uses time-based intervals to proportionally allocate the amount of data to be received from a channel during the interval. The data order may be prioritized utilizing an algorithm that tends to make the fastest channel the bottleneck for the prioritized data transfer. The data order may be prioritized utilizing an algorithm that preempts bottleneck channels. The rate of the prioritized data may be smoothed to minimize burstiness of the transfer. The data transmission may take place over a peer-to-peer network. The multiple channels may terminate at the same source. The channels may be heterogeneous, with different protocols and channel adapters used to receive data from these multiple channels in parallel. The channels may be chosen by a ranking of channels or channel sources. New channels and channel sources may be added dynamically during the data transfer. The channels may have adapters that provide encryption, compression, or delta encoding.

In another embodiment, a method comprises providing integrity verification and corruption repair for the data transfer. The data may be transferred over multiple channels in parallel with data order prioritization. The integrity verification may utilize an iterative hash construct, such as a Merkle Hash Tree, and a corruption repair engine utilizes combinations of channel sources to pinpoint corruption. An amount of data that a source has provided may be used in determining the likeliness that the source caused the corruption. A majority of sources may remain the same between iterations. Integrity checking and corruption repair may be performed in iterations. The corruption can be further pinpointed by increasing the resolution of the verification algorithm or by employing multiple verification algorithms. A source may be proven to have caused the corruption, and may be announced to other components in the system or external systems. Bandwidth throttling can be employed to prioritize or deprioritize channels for scheduling. The bandwidth throttling is used to slow the overall data transfer across all channels. The bandwidth throttling can be used across all channels to the source to limit the data transfer rate to that source. A highly ranked source can be pipelined to compensate for latency. Slots can be used to track which sources are currently scheduled.

In another embodiment, a computer-readable medium comprises instructions to cause a processor to receive data over multiple channels in parallel with data order prioritization and present the data to a user.

Various embodiments have been described. The described techniques can be embodied in a variety of devices, including personal computers, workstations, servers, mobile phones, laptop computers, handheld computing devices, personal digital assistants (PDA's), and the like. The devices may include a microprocessor, a digital signal processor (DSP), field programmable gate array (FPGA), application specific integrated circuit (ASIC) or similar hardware, firmware and/or software for implementing the techniques. If implemented in software, a computer-readable medium may store computer readable instructions, i.e., program code, that can be executed by a processor to carry out one of more of the techniques described above. For example, the computer-readable medium may comprise random access memory (RAM), read-only memory (ROM), non-volatile random access memory (NVRAM), electrically erasable programmable read-only memory (EEPROM), flash memory, or the like. These and other embodiments are within the scope of the following claims.

The invention claimed is:

1. A parallel download system executing on a client computer to control download of data from a plurality of source servers in parallel the system comprising:

a source scheduler that ranks a plurality of communication channels to generate a download schedule to control which of the plurality of communication channels will be downloaded from in parallel at a point in time, wherein each of the source servers stores a copy of at least a portion of a file containing data, and wherein each of the plurality of communication channels comprises a network connection to one of the plurality of source servers;

a prioritization scheduler that determines a range of the data that should be requested from one or more of the plurality of source servers and the point in time when the range of data should be requested from the one or more of the plurality of source servers, wherein the prioritization scheduler tracks an overall latency and throughput for all the communication channels for one or more of the source servers while downloading at least a portion of the data of the file from two or more of the plurality of communication channels in parallel and, based on the latency and throughput of the communication channels, dynamically adjusts the download schedule including the range of data and the point in time to request the range of data for at least one of the communication channels while downloading the data in parallel to control download performance;

a proportional allocator that, for a source server of the one or more source servers, determines a plurality of portions of the range of data for that source server that should be downloaded using one or more of the communication channels to that source server, wherein each of the portions of the range of data to be downloaded from that source server is determined based on one or more of an expected throughput and latency of each of the one or more communication channels to that source server and a time interval assigned by the proportional allocator for downloading the range of data using the communication channels; and an I/O dispatcher to produce an output stream to present the downloaded data to one or more external applications or a user.

2. The parallel download system of claim 1, wherein the source scheduler keeps track of information about each source server and uses that information to decide which source servers to download from.

3. The parallel download system of claim 1, further comprising a data prioritizer that determines the priority of the data within the file to be scheduled, wherein the data prioritizer specifies an ordering of the data within the file from a highest priority data to a lowest priority data, and wherein different portions of the file are downloaded in parallel from the two or more of the plurality of servers in accordance with the ordering of the data within the file as specified by the data prioritzer and the download schedule as dynamically adjusted by the prioritization scheduler.

4. The parallel download system of claim 3, wherein the prioritization scheduler adjusts the download schedule with respect to the different servers while maintaining a prioritization order in which the data within the file will be received.

5. The parallel download system of claim 3, wherein the data prioritizer specifies the ordering of the data within the file from the highest priority data to the lowest priority data by adjusting the ordering of the data within the file during the download of the different portions of the file from the two or more plurality of servers.

6. The parallel download system of claim 5, further comprising one or more external applications that are attempting to access the data within the file, wherein the data prioritizer adjusts the ordering of the data within the file based on which one or more external applications are attempting to access the data within the file.

7. The parallel download system of claim 5, further comprising a corruption repair engine that detects and repairs corruption in previously downloaded portions of the data within the file, wherein the data prioritizer adjusts the ordering of the data within the file based on the detected and repaired corruption.

8. The parallel download system of claim 7, wherein the data prioritizer assigns a higher priority to the data within the file that the corruption repair engine is repairing.

9. The parallel download system of claim 5, wherein the data prioritizer assigns priority based on the number of servers from which the data is available for download.

10. The parallel download system of claim 3, wherein the data prioritizer employs a prioritization scheme when multiple applications or component are simultaneously specifying different portions of the data to prioritize.

11. The parallel download system of claim 10, wherein the prioritization scheme comprises at least one of a First Come First Serve, Last Come First Serve, Random, Shortest Processing Time First, Round Robin, and Shortest Remaining Processing Time First.

12. The parallel download system of claim 3, wherein the highest priority data is downloaded on average before the lowest priority of data.

13. The parallel download system of claim 1, further comprising one or more channel adapters to translate encoded information from a first format used to transfer the information across a channel to a second format desired for a download.

14. The parallel download system of claim 1, further comprising a control interface that allows external applications or users to control the behavior of the parallel download system.

15. The parallel download system of claim 1, further comprising a bulk scheduler to determine which bytes of the data within the file will be scheduled.

16. The parallel download system of claim 1, wherein the time interval comprises a current time interval, the system further comprising an advanced scheduler that integrates with the proportional allocator to allow data to be allocated during a different time interval than the current time interval.

17. The parallel download system of claim 16, wherein the advanced scheduler features a sub-interval smoothing component that reduces the burstiness of the availability of high priority data with the proportional allocator.

18. The parallel download system of claim 1, further comprising a constraint scheduler to ensure that the source scheduler does not attempt to retrieve data that at least one of the plurality of source servers cannot provide.

19. The parallel download system of claim 1, further comprising one or more channel receivers to read the data from a respective communication channel and writes it to an I/O dispatcher.

20. The parallel download system of claim 1, further comprising an integrity verification engine to determine that the desired data is received intact and that none of the communication channels were providing data that is either corrupt or a different version of the content that is desired.

21. The parallel download system of claim 20, wherein the integrity verification engine utilizes a hash construct.

22. The parallel download system of claim 21, wherein the iterative hash construct comprises a Merkle Hash Tree.

23. The parallel download system of claim 20, further comprising a corruption repair engine to repair data corruption detected by the integrity verification engine.

24. The parallel download system of claim 1, further comprising one or more channel connector to establish a new communication channel to the scheduled source server.

25. The parallel download system of claim 1, wherein the source scheduler ranks the source servers according to one or more of:

external ranking input received from a user or an administrator or an external ranking service;

a throughput associated with each source server;

a latency associated with each source server;

a number of network hops to the source server from the parallel download system;

a geographical location of each source server relative to the parallel download system; and a channel cost associated with the channel from the parallel download system to each source server.

26. The parallel download system of claim 1, wherein different portions of the file are downloaded in parallel from the two or more of the plurality of servers in accordance with the download schedule.

27. The parallel download system of claim 1, wherein a new server is added to the plurality of servers during download of data.

28. The parallel download system of claim 1, wherein at least one server of the plurality of servers is removed during download of data.

29. The parallel download system of claim 1, wherein the prioritization scheduler comprises the proportional allocator.

30. The parallel download system of claim 1, wherein at least two of the communication channels provide network connections to a same one of the plurality of source servers.

* * * * *